Jan. 31, 1961            F. TOLKIEN            2,969,804

AUTOMATIC VALVE FOR AIR PUMPS AND THE LIKE

Filed May 19, 1955            2 Sheets-Sheet 1

INVENTOR
Fritz Tolkien

ATTORNEYS

Jan. 31, 1961   F. TOLKIEN   2,969,804
AUTOMATIC VALVE FOR AIR PUMPS AND THE LIKE
Filed May 19, 1955   2 Sheets-Sheet 2
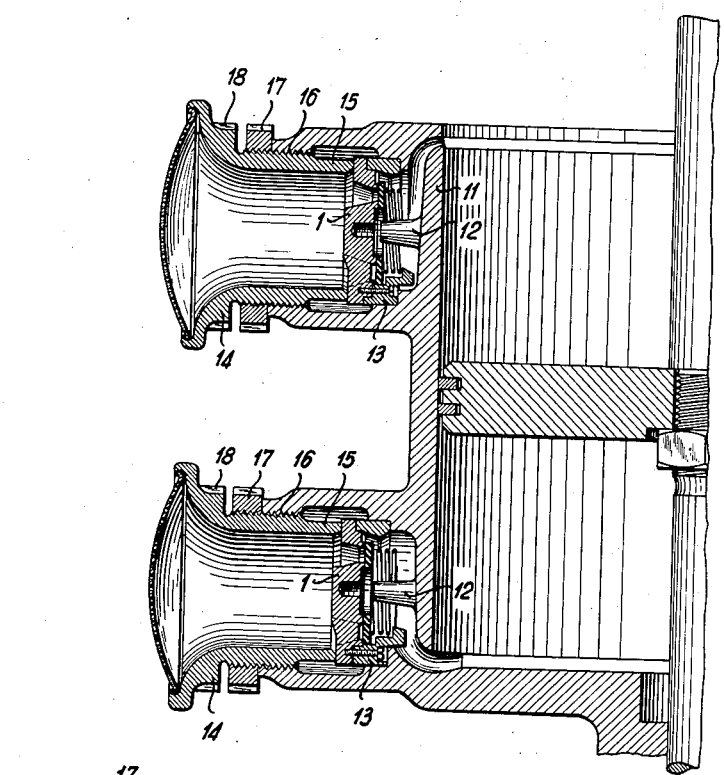
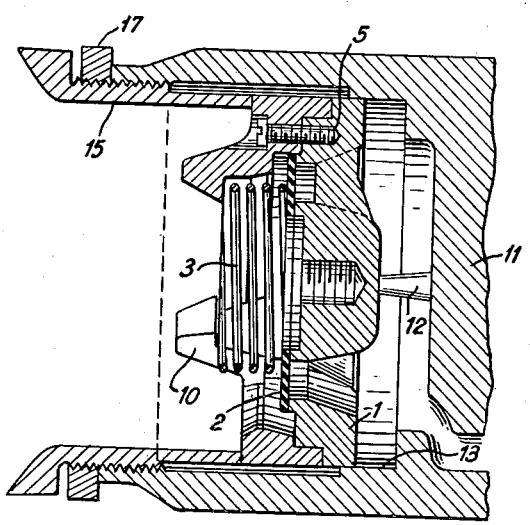
INVENTOR
Fritz Tolkien
ATTORNEYS

United States Patent Office 2,969,804
Patented Jan. 31, 1961

2,969,804

AUTOMATIC VALVE FOR AIR PUMPS AND THE LIKE

Fritz Tolkien, 4 Brahmsstrasse, Hannover, Germany

Filed May 19, 1955, Ser. No. 509,606

Public Law 619, Aug. 23, 1954
Patent expires Dec. 30, 1968

3 Claims.  (Cl. 137—269.5)

The invention relates to an automatic valve particularly for air pumps of the kind adapted to be automatically opened by the pressure of the fluid passing therethrough and closed by spring pressure and comprising a valve disc or plate guided externally by three lugs or projections spaced apart on an annular body or member.

In known valves of this kind the form of the annular member permits lateral flow of the fluid passing through the valve at a position immediately above the valve seat thus giving rise to forces tending to displace the valve disc in a radial direction. These forces in course of time lead to warping of the valve disc resulting in interference with the operation of the valve. In order to reduce these lateral forces it has been found necessary to provide a special guide wall in the pump casing.

The object of the present invention is to provide an arrangement in which warping of the valve disc is prevented without the necessity for providing a special guide wall in the pump casing.

With the foregoing object in view an automatic valve made in accordance with the present invention comprises in combination a valve seat member, a valve disc extending over an annular aperture in said member, an annular body member of wider internal diameter than the diameter of said valve disc enclosing said valve disc so as, when said valve disc is open, to provide an axially directed flow passage between said annular body member and said valve disc, and a helical valve spring abutting against said valve disc and against said body member. In the new valve the flow of fluid above the valve seat is immediately conducted in an axial direction. As a result no forces are set up tending to displace the valve disc in a radial direction. Since the hooks restraining the valve spring are in the same positions as the lugs, no additional disturbance of the flow due to the hooks is caused. The new valve thus possesses favourable hydraulic efficiency and the provision of the special guide wall above referred to is avoided so that the casting is simplified.

The invention also consists in the arrangement of the valve so that when the valve is reversed, the valve seat member abuts against a pin cast on the pump cylinder before the seat member is fully within its guide in the pump casing. The pin cast on the pump cylinder projects into the space within the hooked lugs. As a result sharp variations in the flow cross sections are reduced and the turbulent flow of fluid is converted into streamline flow. This assists in preventing the deposit of foreign particles on the parts of the valve.

A constructional example of the invention and its arrangement are illustrated in the accompanying drawing in which:

Fig. 3 is a sectional view of a pump cylinder provided with valves in accordance with the invention, and Fig. 4 is a view showing the valve positioned for use as an outlet valve.

Figure 1:
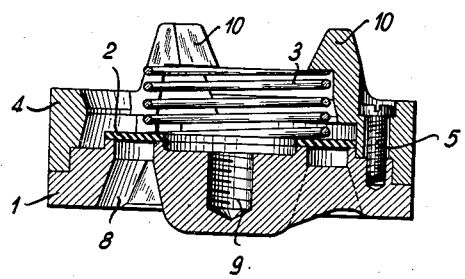
Fig. 1 is a vertical central sectional view of the valve.
Figure 2:
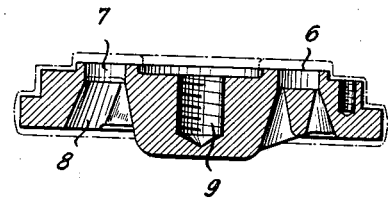
Fig. 2 is a similar view of the valve seat member with the original form of the seat valve blank indicated in dotted lines.

The valve shown in the drawing comprises a valve seat member 1 with internal webs 8, a valve disc or plate 2, a valve spring 3 and an annular member 4. During the die-casting of the valve seat member the blank is formed with an annular web 7 on its upper end eventually forming the valve seat, this web being subsequently cut away and the annular seat rib ground by turning in a lathe.

On one side of the valve seat member an internally screw-threaded blind hole 9 is provided into which the screw-threaded end of a hand tool can be inserted by means of which the valve seat member of a pressure valve can be removed from the pump casing.

In order to guide the valve disc 2 the annular member 4 is provided with three spaced lugs formed thereon, these lugs terminating in hooks 10 extending over the valve spring 3. The annular member 4 directly encloses the seat member 1. In the pump cylinder 11 a pin 12 is cast which projects centrally within the valve and terminates just in front of the seat member 1. When the valve is reversed (for use as a discharge or outlet valve) the pin 12 will abut against the valve seat member before the valve is fully home in its guide 13 in the pump casing. In either case the valve may be held in position by a clamping member 15 locked in place by a locking nut 17.

The invention is not limited to the particular construction and arrangement shown in the drawing by way of example.

What I claim and desire to secure by Letters Patent is:

1. In combination, an automatic valve comprising a valve seat member having passages therethrough and terminating in an annular valve seat, a valve disc resting on said valve seat, webs in said valve seat member defining said passages, a circumferentially continuous annular body member of wider internal diameter than the diameter of said valve disc which is axially at least as long as the stroke of said valve disc and encloses said valve disc so as to provide an axially directed flow passage between said annular body member and said valve disc when said valve disc is in open position, a plurality of lugs formed on said body member and having hooked ends, and a helical spring interposed between said hooked ends and said valve disc, said valve being reversibly mounted in an opening in a casing, said casing being provided with a stud projecting from one end thereof axially of said valve, said stud having a free end slightly spaced from said valve seat when said valve is mounted for use as an inlet valve, and butting against said valve seat when said valve is reversed in said casing for use as an outlet valve.

2. In combination, an automatic valve comprising a valve seat member, a valve disc extending over an annular aperture in said seat member, a plurality of webs extending across said aperture within said seat member, a circumferentially continuous annular body member of wider internal diameter than the diameter of said valve disc which is axially at least as long as the stroke of said valve disc and encloses said valve disc so as to provide an axially directed flow passage between said annular body member and said valve disc when said valve disc is in open position, a plurality of lugs projecting from said body member corresponding in number to said webs and in alignment therewith, a hooked end on each of said lugs, and a helical spring interposed between said hooked ends and said valve disc, said valve being reversibly mounted in an opening in a casing, said casing being provided with a stud projecting from one end thereof axially of said valve, said stud having a free end slightly spaced from said valve seat when said valve is mounted for use as an inlet valve, and butting against said valve seat when said valve is reversed in said casing for use as an outlet valve.

3. In combination, an automatic valve comprising a valve seat member, a valve disc extending over an annular aperture in said seat member, a circumferentially continuous annular body member of greater internal diameter than the diameter of said valve disc which is axially at least as long as the stroke of said valve disc and encloses said valve disc so as to provide an axially directed flow passage between said annular body member and said valve disc when said valve disc is in open position, and a helical valve spring abutting against said valve disc and against said body member, said valve being reversibly mounted in an opening in a casing, said casing being provided with a stud projecting from one end thereof axially of said valve, said stud having a free end slightly spaced from said valve seat when said valve is mounted for use as an inlet valve, and abutting against said valve seat when said valve is reversed in said casing for use as an outlet valve.

References Cited in the file of this patent

UNITED STATES PATENTS

| | | |
|---|---|---|
| 379,446 | Cary | Mar. 13, 1888 |
| 556,023 | Pew | Mar. 10, 1896 |
| 1,044,300 | Tryon | Nov. 12, 1912 |
| 1,359,006 | Wardwell | Nov. 16, 1920 |
| 1,668,342 | Small | May 1, 1928 |
| 1,677,056 | Small | July 10, 1928 |
| 1,993,567 | Richardson | Mar. 5, 1935 |
| 2,613,870 | Borgerd | Oct. 14, 1952 |
| 2,615,618 | Chabay | Oct. 28, 1952 |
| 2,622,842 | Coffey | Dec. 23, 1952 |